(12) United States Patent
Cummings et al.

(10) Patent No.: US 8,528,367 B2
(45) Date of Patent: Sep. 10, 2013

(54) SYSTEMS AND METHODS FOR COOLING OPTICAL FIBER

(75) Inventors: Gary Alan Cummings, Castle Hayne, NC (US); Samir Khanna, Naperville, IL (US); Douglas Gregg Neilson, Wilmington, NC (US); Thomas A Pedersen, Fjell (NO); Massoud Rahiminejad, Wilmington, NC (US); Bruce Warren Reding, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/531,901

(22) Filed: Jun. 25, 2012

(65) Prior Publication Data

US 2012/0260697 A1  Oct. 18, 2012

Related U.S. Application Data

(62) Division of application No. 12/911,054, filed on Oct. 25, 2010, now Pat. No. 8,230,704.

(60) Provisional application No. 61/255,527, filed on Oct. 28, 2009.

(51) Int. Cl.
  *C03B 37/10* (2006.01)

(52) U.S. Cl.
  USPC ............... 65/434; 65/475; 65/477; 65/513

(58) Field of Classification Search
  USPC ................... 65/434, 513, 475, 477
  See application file for complete search history.

(56) References Cited

U.S. PATENT DOCUMENTS

| | | | |
|---|---|---|---|
| 4,514,205 A | 4/1985 | Darcangelo et al. | 65/12 |
| 4,664,689 A | 5/1987 | Davis | 65/3.11 |
| 4,761,168 A | 8/1988 | Blyler, Jr. et al. | 65/3.1 |
| 4,838,918 A | 6/1989 | Vaughan et al. | 65/12 |
| 4,894,078 A | 1/1990 | Takimoto et al. | 65/3.4 |
| 5,043,001 A | 8/1991 | Cain et al. | 65/2 |
| 5,314,515 A | 5/1994 | Cain | 65/3.11 |
| 5,383,946 A | 1/1995 | Naka et al. | 65/443 |
| 6,125,638 A | 10/2000 | Ji et al. | 62/63 |
| 6,279,354 B1 | 8/2001 | Paek et al. | 65/510 |
| 6,338,878 B1 | 1/2002 | Overton et al. | 427/508 |
| 6,345,451 B1 | 2/2002 | Arslanian et al. | 34/428 |

(Continued)

FOREIGN PATENT DOCUMENTS

| | | |
|---|---|---|
| DE | 3707969 | 12/1987 |
| DE | 4412563 | 10/1995 |
| JP | 1208345 | 8/1989 |
| WO | 99/26891 | 6/1999 |

*Primary Examiner* — Queenie Dehghan
(74) *Attorney, Agent, or Firm* — Svetlana Short (57) ABSTRACT

In one embodiment, an optical fiber cooling system includes a first cooling tube oriented substantially in parallel with and spaced apart from a second cooling tube such that an optical fiber pathway is positioned between the first cooling tube and the second cooling tube. The first cooling tube includes a plurality of cooling fluid outlets positioned along an axial length of the first cooling tube which are oriented to direct a flow of cooling fluid across the optical fiber pathway towards the second cooling tube. The second cooling tube includes a plurality of cooling fluid outlets positioned along an axial length of the second cooling tube which are oriented to direct a flow of cooling fluid across the optical fiber pathway towards the first cooling tube.

5 Claims, 6 Drawing Sheets

(56) References Cited

U.S. PATENT DOCUMENTS

| | | |
|---|---|---|
| 6,565,775 B2 | 5/2003 | Dubois et al. ............. 264/1.24 |
| 6,576,164 B2 | 6/2003 | Guenot et al. ............. 264/1.24 |
| 6,715,323 B1 | 4/2004 | Roba et al. ................. 65/434 |
| 8,091,388 B2 * | 1/2012 | Cooper et al. .............. 65/525 |
| 2004/0011084 A1 | 1/2004 | Lee et al. ................... 65/510 |
| 2009/0139269 A1 * | 6/2009 | Filippov et al. ............ 65/425 |

* cited by examiner

SYSTEMS AND METHODS FOR COOLING OPTICAL FIBER

CROSS REFERENCE

This application is a divisional of U.S. patent application Ser. No. 12/911,054 filed on Oct. 25, 2010, now U.S. Pat. No. 8,230,704, which claims priority to U.S. Provisional Application 61/255,527, filed Oct. 28, 2009 and entitled "Systems and Methods for Cooling Optical Fiber", the contents of which are relied upon and incorporated herein by reference in their entirety, and the benefit of priority under 35 U.S.C. 120 is hereby claimed.

BACKGROUND

1. Field

The present specification generally relates to systems and methods for producing optical fiber and, more specifically, to systems and methods for cooling optical fiber.

2. Technical Background

Glass optical fiber is generally formed by drawing the optical fiber from a preform which is heated to a draw temperature in a draw furnace. After the optical fiber is drawn from the preform, the bare or uncoated optical fiber may be susceptible to damage from mechanical contact. Such damage may adversely affect both the mechanical and optical properties of the optical fiber. Accordingly, to prevent such damage, a coating may be applied to the optical fiber soon after the optical fiber is drawn from the preform. However, if the coating is applied to the heated optical fiber (e.g., if the coating is applied to the optical fiber immediately after the optical fiber is drawn from the preform) the elevated temperature of the optical fiber may reduce the effectiveness of the coating for protecting the optical fiber.

Given that the optical fiber process is vertically constrained, cooling of the optical fiber is generally accomplished over the fixed distance. As such, the optical fiber must be aggressively cooled over a fixed distance to reach a temperature suitable for application of the coating. Accordingly, the rate at which the optical fiber is cooled may be one rate limiting step in increasing the drawing speed of optical fiber. Further, gases currently used to cool optical fibers, such as helium gas, may be expensive and may require refrigeration to achieve the necessary cooling thereby adding to the overall cost of the optical fiber manufacturing process.

Accordingly, alternative systems and methods for cooling optical fiber are needed.

SUMMARY

According to one embodiment, an optical fiber cooling system includes a first cooling tube oriented substantially in parallel with and spaced apart from a second cooling tube such that an optical fiber pathway is positioned between the first cooling tube and the second cooling tube. The first cooling tube comprises a plurality of cooling fluid outlets positioned along an axial length of the first cooling tube. The cooling fluid outlets of the first cooling tube are oriented to direct a flow of cooling fluid across the optical fiber pathway towards the second cooling tube. The second cooling tube comprises a plurality of cooling fluid outlets positioned along an axial length of the second cooling tube. The cooling fluid outlets on the second cooling tube are oriented to direct a flow of cooling fluid across the optical fiber pathway towards the first cooling tube.

In another embodiment, an optical fiber cooling system includes an optical fiber cooling tube positioned in and substantially coaxial with a cooling fluid supply plenum. The optical fiber cooling tube generally defines an optical fiber pathway through the optical fiber cooling system and includes a plurality of cooling fluid inlets positioned along an axial length of the optical fiber cooling tube. The cooling fluid inlets are configured to direct a flow of cooling fluid across the optical fiber pathway from at least two different directions. At least one cooling fluid vent may be disposed along the axial length of the optical fiber cooling tube between first and second ends of the optical fiber cooling tube. The at least one cooling fluid vent may have a cross sectional area which is larger than a cross sectional area of a cooling fluid inlet. Further, the at least one cooling fluid vent may be operable to exhaust cooling fluid from the optical fiber cooling tube and thereby prevent bulk axial flow of cooling fluid through the optical fiber cooling tube. The at least one cooling fluid vent may be fluidly coupled to a cooling fluid exhaust plenum positioned within the cooling fluid supply plenum.

In another embodiment, a method for cooling an optical fiber during an optical fiber drawing operation includes drawing an optical fiber along an optical fiber pathway positioned between a first cooling tube and a second cooling tube. Thereafter, a flow of cooling fluid is directed onto the optical fiber through cooling fluid outlets positioned along an axial length of the first cooling tube and a flow of cooling fluid is directed onto the optical fiber through cooling fluid outlets positioned along an axial length of the second cooling tube. The cooling fluid is vented such that bulk axial flow of cooling fluid along the optical fiber pathway is prevented.

Additional features and advantages of the invention will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 2:
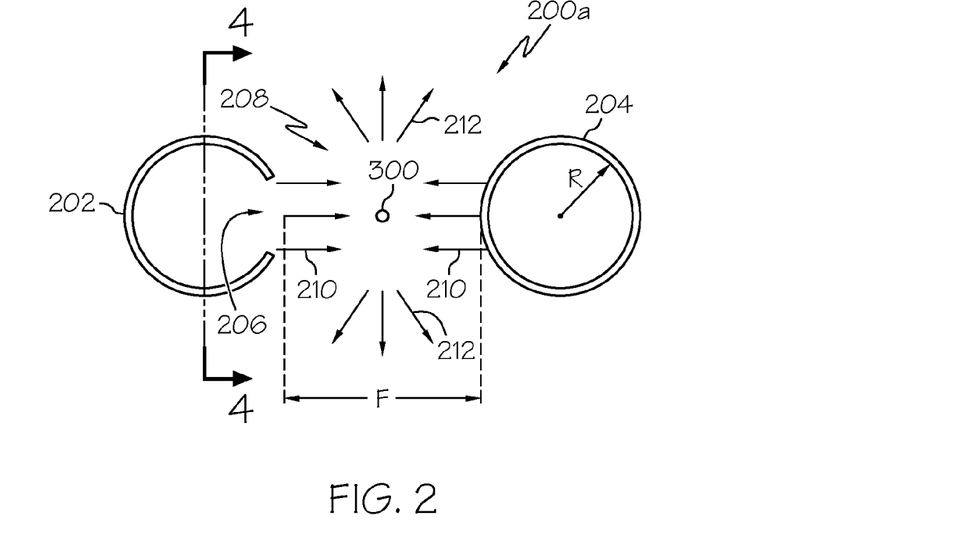
FIG. 2 depicts a horizontal cross section of an optical fiber cooling system according to one or more embodiments shown and described herein.

Reference will now be made in detail to various embodiments of optical fiber cooling systems, examples of which are illustrated in the accompanying drawings. Whenever possible, the same reference numerals will be used throughout the drawings to refer to the same or like parts. One embodiment of an optical fiber cooling system is generally depicted in FIG. 2. The optical fiber cooling system generally comprises a first cooling tube and a second cooling tube oriented in parallel with one another and spaced apart from one another such that an optical fiber pathway is positioned between the first and second cooling tubes. Each of the cooling tubes may comprise a plurality of cooling fluid outlets which are oriented to direct a flow of cooling fluid across the optical fiber pathway towards the opposing cooling tube. Various embodiments of the optical fiber cooling system and systems for drawing optical fiber in which the optical fiber cooling systems are incorporated will be described in further detail herein.

Figure 1:
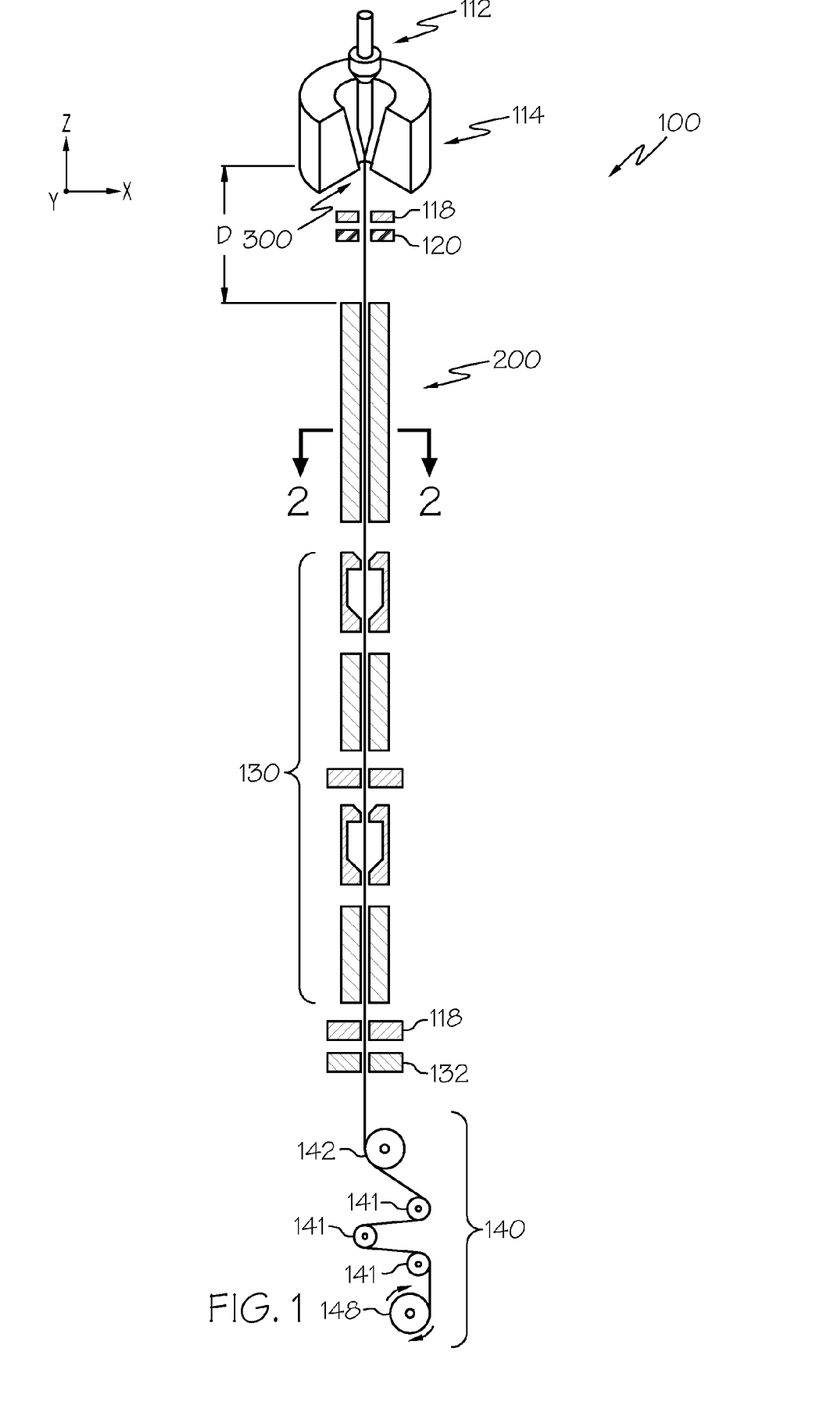
FIG. 1 depicts a cross section of a system for drawing optical fiber from an optical fiber preform according to one or more embodiments shown and described herein.

Referring to FIG. 1, one embodiment of a system 100 for producing coated optical fiber is illustrated. The system 100 may comprise a draw furnace 114 for heating an optical fiber preform 112 such that an optical fiber 300 may be drawn from the optical fiber preform 112. The preform 112 may comprise glass or any material suitable for the manufacture of optical fibers. The draw furnace 114 may be vertically oriented such that optical fiber 300 drawn from the optical fiber preform 112 exits the furnace along a substantially vertical pathway (i.e., a pathway that is substantially parallel with the z-direction of the coordinate axes depicted in FIG. 1).

After the optical fiber 300 exits the draw furnace 114, the diameter of the optical fiber 300 and the draw tension applied to the optical fiber 300 may be measured using non-contact sensors 118, 120. As shown in FIG. 1, after the diameter and tension of the optical fiber 300 are measured, the optical fiber 300 passes through an optical fiber cooling system 200 which cools the optical fiber. In general, the optical fiber cooling system 200 is spaced apart from the draw furnace 114 by a distance D such that the optical fiber 300 cools at ambient temperatures before entering the optical fiber cooling system 200. For example, the distance D between the draw furnace 114 and the optical fiber cooling system 200a may be sufficient to cool the optical fiber sufficient to cool the optical fiber from the draw temperature (e.g., from about 1700° C.-2000° C.) to about 1300° C. and, more preferably, to about 1200° C. before the optical fiber 300 enters the optical fiber cooling system 200.

As the optical fiber 300 travels through the optical fiber cooling system 200, the optical fiber is cooled to less than about 80° C. and, more preferably, less than about 60° C. by directing multiple flows of cooling fluid across the optical fiber pathway over which the optical fiber 300 is drawn through the optical fiber cooling system 200. In general, the cooling fluid flows are directed across the optical fiber pathway in a direction which is substantially transverse to the optical fiber pathway. Moreover, the optical fiber cooling system 200 is configured to prevent substantial bulk axial flow of the cooling fluid through the optical fiber cooling system 200 in the axial direction (i.e., in a direction which is substantially parallel with the z-direction on the coordinate axes in FIG. 1) which, in turn, improves the cooling capacity and cooling efficiency of the optical fiber cooling system 200. The phrase "bulk axial flow," as used herein, refers to the flow of cooling fluid in the axial direction through the optical fiber cooling system. Bulk axial flow of cooling fluid through the optical fiber cooling system may disrupt the transverse flow of cooling fluid across the optical fiber pathway thereby reducing the ability of the optical fiber cooling system to cool the optical fiber. In the embodiments of the optical fiber cooling systems described herein, bulk axial flow of cooling fluid through the optical fiber cooling system is prevented by venting the cooling fluid from the optical fiber cooling system along the axial length of the optical fiber cooling system, as will be described in more detail herein.

Referring now to FIG. 2, one embodiment of an optical fiber cooling system 200a is schematically depicted in horizontal cross section. The phrase "horizontal cross section," as used herein, refers to a cross section through the optical fiber cooling system 200a in an x-y plane as defined by the coordinate axes shown in FIG. 1. The optical fiber cooling system 200a generally comprises a first cooling tube 202 and a second cooling tube 204. The first cooling tube 202 and the second cooling tube 204 are hollow tubes which are substantially parallel with one another and spaced apart from one another such that an optical fiber 300 may be drawn between the first cooling tube 202 and the second cooling tube 204. In the embodiments shown and described herein the first cooling tube 202 and the second cooling tube 204 are spaced apart by a distance F which is generally less than about 26.0 millimeters and, more preferably, from about 9.0 millimeters to about 13.0 millimeters.

Accordingly, it should be understood that an optical fiber pathway 208 along which an optical fiber 300 may be drawn is positioned between the first cooling tube 202 and the second cooling tube 204. In the embodiment of the optical fiber cooling system 200a shown in FIG. 2, the optical fiber pathway 208 is not enclosed. Instead, the optical fiber pathway 208 is directly exposed to the ambient pressure, temperature and atmosphere of the manufacturing environment in which the optical fiber cooling system 200a is deployed. Accordingly, in this embodiment, it should be understood that the flow of cooling fluid 210 directed across the optical fiber pathway 208 may be vented directly to the surrounding ambient atmosphere along substantially the entire axial length of the optical fiber pathway 208 as indicated by the fluid flow egress 212. As described herein, venting the flow of cooling fluid 210 along the axial length of the optical fiber cooling system 200a prevents the bulk axial flow of cooling fluid through the optical fiber cooling system.

In an alternative embodiment (not shown), the first cooling tube 202 and the second cooling tube 204 may be positioned within a fluid containment enclosure (not shown). The fluid containment enclosure may be fluidly coupled to a cooling fluid recovery system which facilitates the active collection and recovery of the cooling fluid emitted by the first cooling tube 202 and the second cooling tube 204. In order to not impede or otherwise affect the egress of cooling fluid from the optical fiber pathway 208 (i.e., in order to prevent bulk axial flow of cooling fluid through the optical fiber cooling system 200a), the fluid containment enclosure may be significantly larger than the first cooling tube 202 and the second cooling tube 204. For example, where the first cooling tube 202 and the second cooling tube have diameters of about 25 mm, as described in more detail herein, the fluid containment enclosure may be greater than about 75 mm in diameter.

Referring now to FIGS. 2-7, in the embodiments of the optical fiber cooling system 200a shown and described herein, the first cooling tube 202 and the second cooling tube 204 are generally circular in cross section. Accordingly, in the embodiments shown herein, the first cooling tube 202 and the second cooling tube 204 are substantially cylindrical. The cooling tubes 202, 204 are closed at one end and, on the opposite end, are fluidly coupled to a supply of cooling fluid. In the embodiments described herein the cooling tubes 202, 204 are formed from a metallic material, such as an aluminum or steel alloy or a similar material, and generally have a wall thickness of less than about 13.0 millimeters, more preferably less than about 6.5 millimeters and, most preferably, less than about 3.5 millimeters. Further, the inner diameter (i.e., twice the (i.e., twice the radius R) of the cooling tubes 202, 204 is preferably less than about 100 mm and, more preferably, less than or equal to 50 mm. In the embodiments described herein the cooling tubes 202, 204 have an axial length L of less than about 6 meters, more preferably less than about 5 meters and, most preferably, about 4 meters. However, it should be understood that the axial length L of the cooling tubes may be larger than 6 meters or shorter than 4 meters depending on the specific system in which the cooling tubes are employed.

While the first cooling tube 202 and the second cooling tube 204 have been described herein as being circular in cross section, it should be understood that the first and second cooling tubes may have different cross sectional geometries. For example, in alternative embodiments the cooling tubes may be substantially D-shaped or semi-circular and the cooling tubes may be oriented such that the curved surfaces of the cooling tubes are opposed to one another. In other embodiments the cooling tubes may be square or rectangular in cross section or have another regular or irregular geometrical shape in cross section. Further, while the first cooling tube 202 and the second cooling tube 204 have been described herein as comprising a metallic material, it should be understood that the cooling tubes may be formed from other materials including, without limitation, polymers, ceramics, and composite materials.

Still referring to FIGS. 2-7, to facilitate cooling the optical fiber 300 with the optical fiber cooling system 200a, cooling fluid is pumped into the cooling tubes 202, 204 with a cooling fluid supply system which is fluidly coupled to the first cooling tube 202 and the second cooling tube 204 with supply conduits 240. In one embodiment, the cooling fluid supply system may comprise a compressor or other apparatus for supplying a flow of pressurized cooling fluid. In another embodiment, the cooling fluid supply system may comprise a fan or other mechanism for directing a flow of cooling fluid into the cooling tubes 202, 204. The cooling fluid exits the cooling tubes 202, 204 through a plurality of cooling fluid outlets 206 which are positioned along the axial length L of the cooling tubes 202. The cooling fluid outlets 206 are oriented such that the cooling fluid outlets 206 in the first cooling tube 202 direct a flow of cooling fluid 210 from the first cooling tube 202 across the optical fiber pathway 208 towards the second cooling tube 204. Similarly, the cooling fluid outlets 206 in the second cooling tube 204 are oriented to direct a flow of cooling fluid 210 from the second cooling tube 204 across the optical fiber pathway 208 towards the first cooling tube 202.

Figure 5:
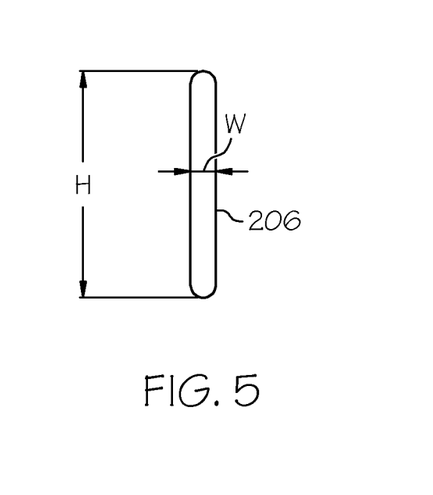
FIG. 5 depicts a cooling fluid outlet according to one embodiment shown and described herein.

As depicted in FIG. 5, each cooling fluid outlet 206 is substantially rectangular in shape with a width W and a height H at the surface of the outer diameter of the cooling tubes 202, 204. In the embodiments described herein the cooling fluid outlets 206 are generally oriented on the cooling tubes 202, 204 such that the height H of the cooling fluid outlets are generally parallel to the x-y plane in the coordinate system shown in FIG. 1 while the width W of the cooling fluid outlets 206 is generally oriented in the z-direction. In the embodiments described herein the cooling fluid outlets 206 have a width W of less than about 0.5 millimeters, more preferably less than about 0.3 millimeters, and most preferably, less than about 0.25 millimeters. Further, in the embodiments described herein the cooling fluid outlets 206 have a height H which is greater than about 2.5 millimeters, more preferably greater than about 6.25 millimeters, and most preferably, greater than about 7.5 millimeters.

Figure 4A:
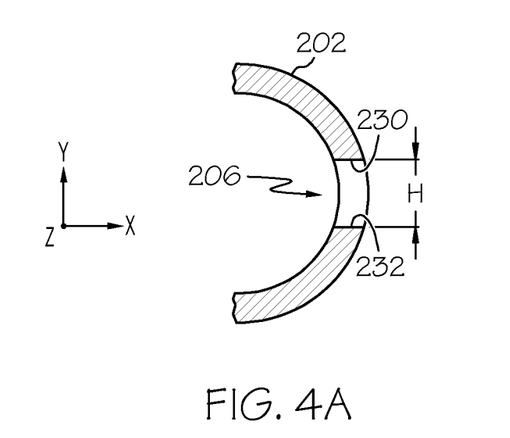
FIG. 4A depicts one embodiment of a cooling fluid outlet in a cooling tube according to one embodiment shown and described herein.

In one embodiment the cooling fluid outlets 206 have substantially parallel sidewalls such that the height H of the cooling fluid outlets is substantially the same through the radial thickness of the cooling tube 202, as depicted in FIG. 4A. More specifically, the sidewalls 230, 232 are substantially parallel with the x-direction of the coordinate system depicted in FIG. 4A and, in turn, parallel with one another. However, in other embodiments, the cooling fluid outlets 206 may taper from the inner diameter of the cooling tube to the height H at the outer diameter of the cooling tube.

Figure 4B:
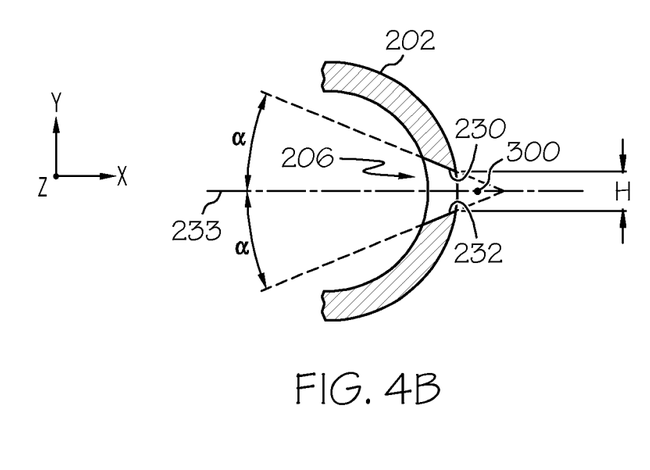
FIG. 4B depicts another embodiment of a cooling fluid outlet in a cooling tube according to one embodiment shown and described herein.

For example, as depicted in FIG. 4B, the sidewalls 230, 232 of the cooling fluid outlet 206 are tapered from the inner diameter of the cooling tube to the outer diameter of the cooling tube. More specifically, in the embodiment of the cooling tube 202 shown in FIG. 4B, the sidewalls of the cooling fluid outlet 206 taper from the inner diameter of the cooling tube 202 to the outer diameter of the cooling tube 202 with respect to the centerline 233 of the cooling fluid outlet 206. In the embodiments shown and describe herein, the sidewalls 230, 232 are each oriented at an angle α with respect to the centerline 233 of the cooling fluid outlet 206. The angle α may be from about 12.5 degrees to about 25 degrees and, more preferably, from about 13.0 degrees to about 21 degrees. Accordingly, it should be understood that, in the embodiment shown in FIG. 4A, the cooling fluid outlet 206 tapers to the height H at the outer diameter and as such, the height of the cooling fluid outlet at the inner diameter of the cooling tube is greater than the height H at the inner diameter. For example, where the height H of the cooling fluid outlet 206 at the outer diameter of the cooling tube is about 7.62 millimeters and the angle α is 20.3 degrees, the height of the cooling fluid outlet 206 at the inner diameter may be about cooling fluid outlet 206 at the inner diameter may be about 11.782 millimeters.

Where the walls of the cooling fluid outlet 206 are tapered, the first cooling tube 202 and the second cooling tube 204 may be positioned such that the flow of cooling fluid 210 exiting the cooling tubes 202, 204 (as shaped by the tapered cooling fluid outlet 206) is focused at the centerline between the first cooling tube 202 and the second cooling tube 204. In another embodiment, the sidewalls of the cooling fluid outlet 206 may be tapered such that a flow of cooling fluid 210 passing through the cooling fluid outlet is not focused at the center of the centerline between the first cooling tube 202 and the second cooling tube 204. For example, the sidewalls of the cooling fluid outlets of the first cooling tube 202 may be tapered such that the flow of cooling fluid is focused between the centerline and the second cooling tube 204. Similarly, the sidewalls of the cooling fluid outlets of the second cooling tube 204 may be tapered such that the flow of cooling fluid is focused between the centerline and the first cooling tube 202. Alternatively, the sidewalls of the cooling fluid outlets of the first cooling tube 202 may be tapered such that the flow of cooling fluid is focused between the centerline and the first cooling tube 202. Similarly, the sidewalls of the cooling fluid outlets of the second cooling tube 204 may be tapered such that the flow of cooling fluid is focused between the centerline and the second cooling tube 204.

Figure 3A:
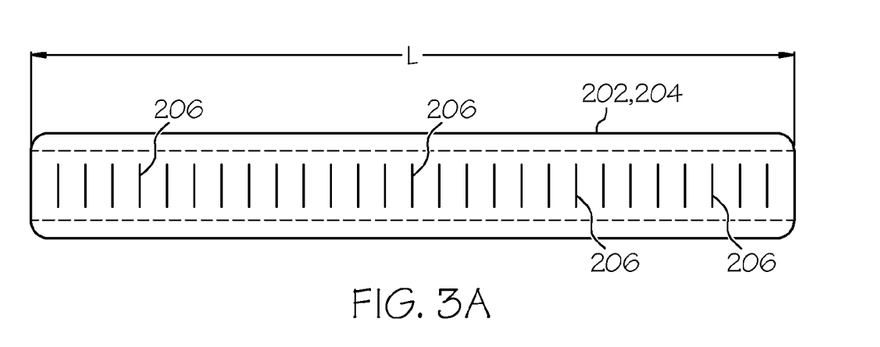
FIG. 3A depicts one embodiment of a cooling tube of the optical fiber cooling system of FIG. 2 according to one or more embodiments shown and described herein.

In the embodiment of the cooling tubes 202, 204 illustrated in FIG. 3A the cooling fluid outlets 206 may be equidistantly spaced along the axial length L of the cooling tubes 202, 204. Accordingly, in this embodiment, it should be understood that the spacing between axially consecutive cooling fluid outlets 206 is the same along the axial length L of the cooling tube 202, 204. For example, in the embodiment shown in FIG. 3A, the axially consecutive cooling fluid outlets 206 may be spaced apart by less than about 50 millimeters, more preferably by about 25 millimeters, and most preferably, by less than about 25 millimeters.

Figure 3B:
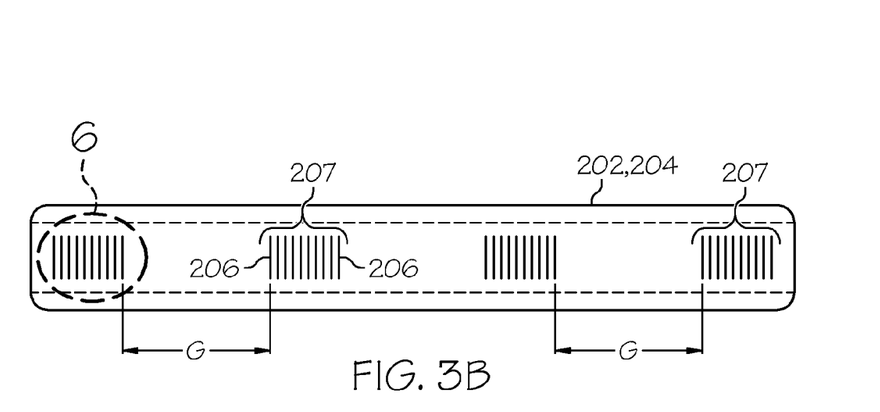
FIG. 3B depicts another embodiment of a cooling tube of the optical fiber cooling system of FIG. 2 according to one or more embodiments shown and described herein.

Alternatively, in the embodiment of the cooling tubes 202, 204 illustrated in FIG. 3B, the cooling fluid outlets 206 are positioned in groups 207. In this embodiment, axially consecutive groups 207 of cooling fluid outlets 206 are equidistantly spaced apart by an amount G along the axial length L of the cooling tube 202, 204. For example, in one embodiment, the spacing G between axially consecutive groups 207 of cooling fluid outlets is less than about 75 millimeters, more preferably less than about 50 millimeters, and more preferably, less than about 40 millimeters.

Figure 6:
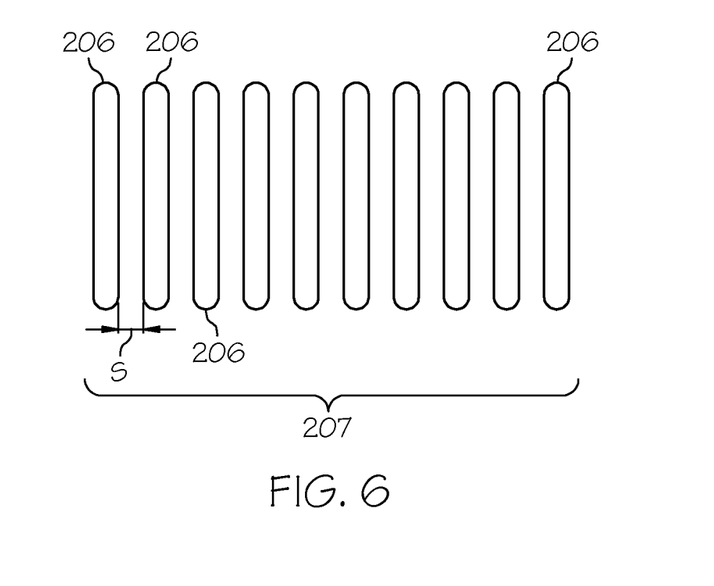
FIG. 6 depicts one group of cooling fluid outlets according to one embodiment shown and described herein.

Further, as shown in FIG. 6, axially consecutive cooling fluid outlets 206 in each group group 207 of cooling fluid outlets 206 are equidistantly spaced by an amount S. For example, in one embodiment, the spacing S between axially consecutive cooling fluid outlets in each group 207 of cooling fluid outlets 206 is less than about 3 millimeters, more preferably less than about 2 millimeters and, most preferably, less than about 1 millimeter. In the embodiment of the group 207 of cooling fluid outlets 206 shown in FIG. 6, each group 207 comprises ten cooling fluid outlets 206. However, it should be understood that each group 207 may comprise more or fewer cooling fluid outlets 206.

Figure 7:
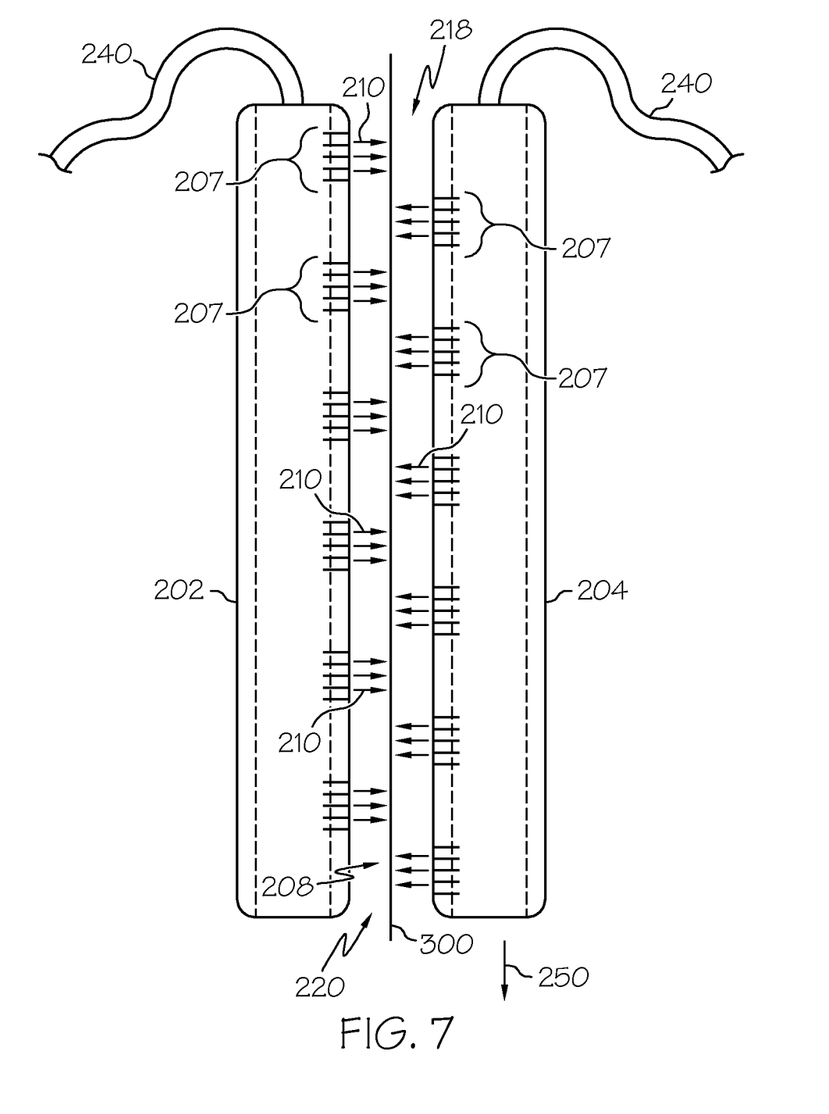
FIG. 7 depicts the optical fiber cooling system of FIG. 2 showing the relative orientation of groups of cooling fluid outlets on opposing cooling tubes.

Irrespective of whether the cooling fluid outlets 206 are grouped together in groups 207, as depicted in FIG. 3B, or the cooling fluid outlets are all equidistantly spaced along the axial length L of the cooling tube, as depicted in FIG. 3A, the cooling fluid outlets 206 of the first cooling tube 202 are generally positioned to direct a flow of cooling fluid 210 from the first cooling tube 202 across the optical fiber pathway 208 towards the second cooling tube 204. Similarly, the cooling fluid outlets 206 of the second cooling tube 204 are generally positioned to direct a flow of cooling fluid 210 from the second cooling tube 204 across the optical fiber pathway 208 towards the first cooling tube 202. In the embodiments shown and described herein, the cooling fluid outlets 206 of the first cooling tube 202 and the cooling fluid outlets 206 of the second cooling tube 204 are not oriented in direct opposition to one another. Instead, the cooling fluid outlets 206 of the first cooling tube 202 and the cooling fluid outlets 206 of the second cooling tube 204 are offset from one another along the axial length of the optical fiber cooling system 200a. For example, referring to FIG. 7, one embodiment of an optical fiber cooling system 200a is depicted in which the cooling fluid outlets are positioned in groups along the axial length of the optical fiber cooling system 200a. As depicted in FIG. 7, each group 207 of cooling fluid outlets on the second cooling tube 204 is positioned between axially consecutive groups 207 of cooling fluid outlets 206 on the first cooling tube 202. Accordingly, the cooling fluid outlets 206 of the first cooling tube 202 do not directly oppose the cooling fluid outlets 206 of the second cooling tube 204.

While FIG. 7 shows groups 207 of cooling fluid outlets which are offset along the axial length of the optical fiber cooling system 200a, it should be understood that individual cooling fluid outlets may also be offset along the axial length of the optical fiber cooling system 200a. For example, each cooling fluid outlet on the second cooling tube 204 may be positioned between axially consecutive cooling fluid outlets 206 on the first cooling tube 202.

Referring now to FIGS. 2 and 7, an optical fiber 300 may enter the optical fiber cooling cooling system 200a at fiber inlet 218 such that the optical fiber 300 is drawn along the optical fiber pathway 208 between the first cooling tube 202 and the second cooling tube 204 and exits the optical fiber cooling system 200a at fiber outlet 220. As the fiber is drawn over the optical fiber pathway 208, cooling fluid is supplied to the optical fiber cooling tubes 202, 204 via fluid supply conduits 240. The cooling fluid may comprise an elemental gas, such as helium or nitrogen, or a mixture of gasses such as, for example, air. Alternatively, the cooling fluid may comprises a combination of various gasses such as helium, nitrogen and/or carbon dioxide. The cooling fluid may be chilled or, alternatively, supplied to the optical fiber cooling system 200a at ambient temperatures.

In one embodiment, the cooling fluid may be supplied to the first cooling tube and the second cooling tube at pressures suitable for achieving a flow of cooling fluid 210 from each cooling fluid outlet 206 which has a velocity of less than about 0.95 mach. For example, when the cooling fluid is air, the air may be supplied to the first cooling tube and the second cooling tube such that the pressure in the first cooling tube and the second cooling tube is about 7 psig. For a cooling fluid outlet having a height H of 7.620 millimeters and a width W of 0.203 millimeters this corresponds to a flow of cooling fluid 210 of about 1 standard cubic foot/minute (scfm) from each cooling fluid outlet 206.

The flow of cooling fluid 210 emitted from each cooling tube 202, 204 is directed across the optical fiber pathway 208 and, more specifically, across the optical fiber 300, towards the opposing cooling tube thereby cooling the optical fiber. After the flow of cooling fluid 210 traverses the optical fiber pathway 208, the cooling fluid is vented to the ambient atmosphere around the opposing cooling tube and/or in a direction perpendicular to the draw direction (e.g., the direction indicated by arrow 250 in FIG. 7). For example, FIG. 2 graphically illustrates a fluid flow egress 212 in a direction which is perpendicular to the draw direction of the optical fiber. Because the cooling fluid is vented out of the optical fiber cooling system 200a in a direction perpendicular to the axial length of the optical fiber cooling system, bulk axial flow of the cooling fluid is prevented thereby improving the cooling capabilities of the optical fiber cooling system 200a.

Figure 8:
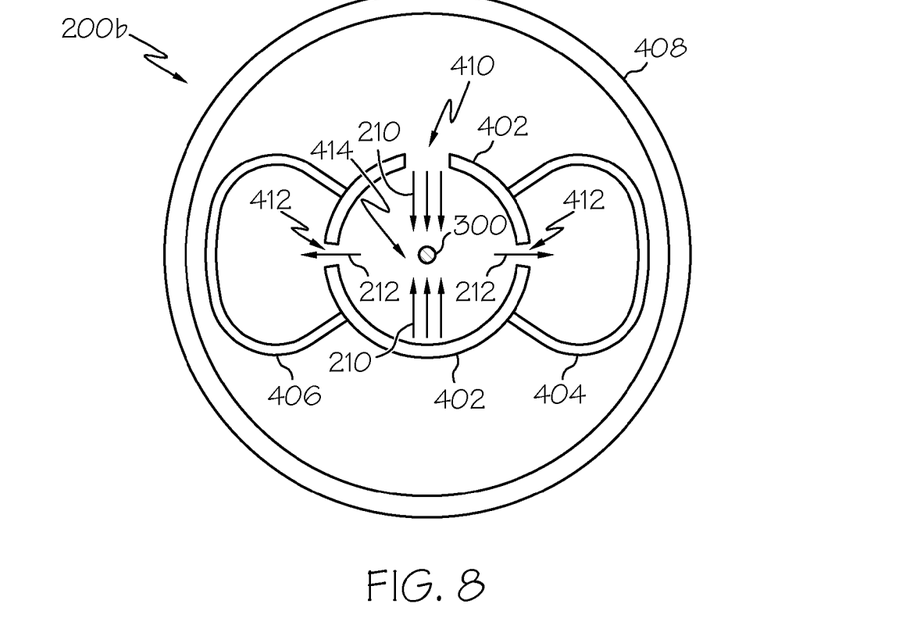
FIG. 8 depicts a horizontal cross section of an optical fiber cooling system according to one or more embodiments shown and described herein.
Figure 9:
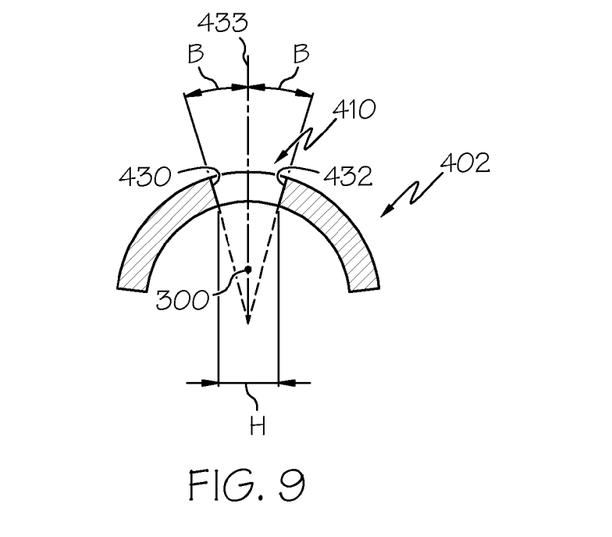
FIG. 9 depicts one embodiment of a cooling fluid inlet in a cooling tube according to one embodiment shown and described herein.

Referring now to FIGS. 8 and 9, an alternative embodiment of an optical fiber cooling system 200b is depicted. FIG. 8 depicts a horizontal cross section of the optical fiber cooling system. In this embodiment the optical fiber cooling system 200b comprises a cooling tube 402, a cooling fluid supply plenum 408 and at least one cooling fluid exhaust plenum. In the the embodiment shown in FIG. 8 the optical fiber cooling system 200b comprises a first cooling fluid exhaust plenum 404 and a second cooling fluid exhaust plenum 406.

The cooling tube 402 is generally circular in cross section. Accordingly, in the embodiment shown herein, the cooling tube 402 is substantially cylindrical. The cooling tube 402 is open at either end thereby forming an optical fiber pathway 414 through the cooling tube 402 through which an optical fiber 300 may be drawn. In the embodiment shown in FIG. 8, the cooling tube 402 is formed from a metallic material, such as an aluminum or steel alloy, or from polymeric materials, composite materials or ceramics. The cooling tube generally has a wall thickness of less than about 13.0 millimeters, more preferably less than about 6.5 millimeters and, most preferably, less than about 3.5 millimeters. Further, the inner diameter of the cooling tube 402 is preferably less than about 100 mm and, more preferably, less than or equal to 50 mm. In the embodiments described herein the cooling tube 402 has an axial length of less than about 6 meters, more preferably less than about 5 meters and, most preferably, about 4 meters. However, it should be understood that the axial length of the cooling tube may be longer than 6 meters or shorter than 4 meters depending on the specific system in which the cooling tubes are employed.

To facilitate cooling an optical fiber 300 positioned in the cooling tube 402, the cooling tube comprises a plurality of cooling fluid inlets 410 disposed along the axial length of the cooling tube 402. For example, the cooling fluid inlets 410 may be equidistantly spaced along the axial length of the cooling tube 402, as described hereinabove with respect to the cooling fluid outlets of the embodiment of the cooling tubes shown in FIGS. 2-7. Alternatively, the cooling fluid inlets may be positioned in groups and the groups may be equidistantly spaced along the axial length of the cooling tube 402. However, in the embodiment of the cooling tube 402 shown in FIG. 8, the cooling fluid inlets are generally configured to direct a flow of cooling fluid across the optical fiber pathway from at least two different directions. In one embodiment, the cooling fluid inlets may be positioned on opposite sides of the cooling tube 402. For example, where individual cooling fluid inlets 410 are equidistantly spaced along the axially length of the cooling tube 402, axially consecutive cooling fluid inlets 410 may be offset in a circumferential direction such that the cooling fluid inlets 410 are 180 degrees apart. Accordingly, in this embodiment, it should be understood that axially consecutive cooling fluid inlets 410 are not directly opposed to one another (i.e., axially consecutive cooling fluid inlets are not located at opposite ends of a diameter of the cooling tube 402). Alternatively, when the cooling tube 402). Alternatively, when the cooling fluid inlets 410 are positioned in groups, axially consecutive cooling fluid inlets in a single group may be positioned on the same side of the cooling tube 402 while axially consecutive groups of cooling fluid inlets are offset in the circumferential direction by 180 degrees. However, it should be understood that the circumferential offset between axially consecutive cooling fluid inlets or axially consecutive groups of cooling fluid inlets may be other than 180 degrees. For example, in one embodiment, axially consecutive cooling fluid inlets or groups of cooling fluid inlets may be offset in the circumferential direction by about 120 degrees. Accordingly, it should be understood that the cooling fluid inlets 410 are positioned such that a flow of cooling fluid is directed substantially across the diameter of the cooling tube 402 in at least two different directions.

In this embodiment, the cooling fluid inlets 410 may have a height and width similar to the height and width of the cooling fluid outlets described above and depicted in FIG. 5. Further, in one embodiment, the sidewalls of the cooling fluid inlets may be substantially parallel through the thickness of the cooling tube similar to the cooling fluid outlets described above and shown in FIG. 4A. Alternatively, the sidewalls of the cooling fluid inlets 410 may be tapered from the outer diameter to the inner diameter of the cooling tube 402.

For example, as depicted in FIG. 9, the sidewalls 430, 432 of the cooling fluid inlet 410 are tapered from the outer diameter of the cooling tube to the inner diameter of the cooling tube. More specifically, in the embodiment of the cooling tube 402 shown in FIG. 9, the sidewalls of the cooling fluid inlet 410 taper from the outer diameter of the cooling tube 402 to the inner diameter of the cooling tube 402 with respect to the centerline 433 of the cooling fluid inlet 410. In the embodiments shown and describe herein, the sidewalls 430, 432 are each oriented at an angle $\beta$ with respect to the centerline 433 of the cooling fluid inlet 410. The angle $\beta$ may be from about 12.5 degrees to about 25 degrees and, more preferably, from about 13.0 degrees to about 21 degrees. Accordingly, it should be understood that, in the embodiment shown in FIG. 9, the cooling fluid inlet 410 tapers to the height H at the inner diameter and as such, the height of the cooling fluid inlet at the outer diameter of the cooling tube is greater than the height H at the inner diameter. In one embodiment, the sidewalls of the cooling fluid inlet may be tapered such that a flow of cooling fluid 210 passing through the cooling fluid inlet is focused at the center of the cooling tube 402. In another embodiment, the sidewalls of the cooling fluid inlet may be tapered such that a flow of cooling fluid 210 passing through the cooling fluid inlet is not through the cooling fluid inlet is not focused at the center of the cooling tube 402, such as when the flow of cooling fluid is focused between the cooling fluid inlet at the center or when the flow of cooling fluid is focused between the center and the opposing wall of the cooling tube 402.

In order to prevent the bulk axial flow of cooling fluid through the cooling tube 402, the cooling tube 402 may comprise a at least one cooling fluid vent 412 positioned along the axial length of the cooling tube 402 between first and second ends of the cooling tube. In the embodiment shown in FIG. 8 the cooling tube 402 comprises a plurality of cooling fluid vents 412. The cooling fluid vents generally have a cross sectional area which is larger than the cross sectional area of a cooling fluid inlet. In the embodiments shown in FIG. 8, the cooling fluid vents are offset from the cooling fluid inlets 410 in a circumferential direction. Accordingly, it should be understood that the cooling fluid vents 412 are not opposed to the cooling fluid inlets 410. For example, in the embodiment shown in FIG. 8, the cooling fluid vents 412 are offset at about a 90 degree angle with respect to the cooling fluid inlets 410. However, it should be understood that various other relative orientations between the cooling fluid vents 412 and the cooling fluid inlets 410 may be possible. The cooling fluid vents 412 offset form the cooling fluid inlets 410 in the circumferential direction facilitates coupling the cooling fluid vents 412 to a continuous exhaust plenum, as will be described in more detail herein. Further, while the embodiment in FIG. 8 shows the cooling fluid vents 412 as directly opposed to one another, it should be understood that, in other embodiments, the cooling fluid vents may be offset from one another in the axial direction of the cooling tube such that axially consecutive cooling fluid vents are not in direct opposition to one another (i.e., axially consecutive cooling fluid vents are not positioned at opposite ends of a diameter of the cooling tube 402). In one embodiment, the cooling fluid vents 412 comprise slots which extend substantially along the entire axial length of the cooling tube 402. In another embodiment, the cooling fluid vents are discrete openings in the cooling tube 402.

Still referring to FIGS. 8 and 9, the cooling fluid vents 412 may be fluidly coupled to a first cooling fluid exhaust plenum 404 and a second cooling fluid exhaust plenum 406. The cooling fluid exhaust plenums 404, 406 may extend along the axial length of the cooling tube 402. In one embodiment, the cooling fluid exhaust plenums 404, 406 and the cooling tube 402 are integrally formed such as when the cooling fluid exhaust plenums and the cooling tube are formed in a single extrusion operation. Alternatively, the cooling fluid exhaust plenums 404, 406 406 may be formed separately from the cooling tube 402 and attached to the cooling tube such as by welding and/or conventional fasteners. While the embodiment of the optical fiber cooling system 200b illustrated in FIG. 8 depicts a single exhaust plenum attached to either side of cooling tube 402, it should be understood that, when the optical fiber cooling system 200b comprises multiple discrete cooling fluid vents positioned along the axial length of the cooling tube 402, each cooling fluid vent may be fluidly coupled to a separate exhaust plenum.

In one embodiment, the cooling fluid exhaust plenums 404, 406 may be open to the ambient atmosphere thereby allowing cooling fluid to vent to the atmosphere. In another embodiment, the cooling fluid exhaust plenums 404, 406 may be fluidly coupled to a fluid recovery system (not shown). The fluid recovery system may be used to actively exhaust the cooling fluid exhaust plenums 404, 406 by applying a negative pressure on the cooling fluid exhaust plenums 404, 406 thereby drawing the cooling fluid out of the optical fiber cooling system 200b. To facilitate use of the fluid recovery system, one end of each cooling fluid exhaust plenum 404, 406 may be closed and the opposite end may be coupled to the fluid recovery system. Alternatively, both ends of each cooling fluid exhaust plenum 404, 406 may be fluidly coupled to the fluid recovery system.

In order to provide a flow of cooling fluid through the cooling fluid inlets 410 and across the optical fiber pathway 414, the cooling tube 402 is positioned in and substantially coaxial with a cooling fluid supply plenum 408. Accordingly, it should be understood that the cooling tube 402 is substantially centered in the cooling fluid supply plenum 408 and operable to supply cooling fluid to the cooling fluid inlets positioned about the circumference of the cooling fluid tube 402. Further, it should be understood that the cooling fluid exhaust plenums 404, 406 are also located in the cooling fluid supply plenum 408. The cooling fluid supply plenum 408 may generally be a tube or similar structure formed from a metallic material, polymers, ceramics and/or composite materials. In the embodiment of the cooling fluid supply plenum 408 shown herein, the cooling fluid supply plenum 408 is formed from a metallic material such as an aluminum alloy or a steel alloy.

In general, both ends of the cooling fluid supply plenum 408 are sealed between the inner diameter of the cooling fluid supply plenum 408 and the outer diameter of the cooling tube 402 and between the inner diameter of the cooling fluid supply plenum and the outer diameter of the cooling fluid exhaust plenums 404, 406 such that the space between the cooling tube 402 and the cooling fluid supply plenum 408 and the space between the cooling fluid exhaust plenums fluid exhaust plenums 404, 406 and the cooling fluid supply plenum may be filled with a pressurized cooling fluid which, in turn, is released into the cooling tube 402 through the cooling fluid inlets 410.

The cooling fluid supply plenum 408 may be fluidly coupled to a cooling fluid supply system (not shown). In one embodiment, the cooling fluid supply system may comprise a compressor or other apparatus for supplying a flow of pressurized cooling fluid. In another embodiment, the cooling fluid supply system may comprise a fan or other mechanism for directing a flow of cooling fluid into the cooling fluid supply plenum 408.

Referring to FIG. 8, an optical fiber 300 drawn through the cooling tube 402 along the optical fiber pathway 414. As the optical fiber 300 is drawn over the optical fiber pathway 414, cooling fluid is supplied to the optical fiber cooling tubes 402 via the cooling fluid inlets 410. The cooling fluid may comprise an elemental gas, such as helium or nitrogen, or a mixture of gasses such as, for example, air. Alternatively, the cooling fluid may comprises a combination of various gasses such as helium, nitrogen and/or carbon dioxide. The cooling fluid may be chilled or, alternatively, supplied to the optical fiber cooling system 200b at ambient temperatures.

In one embodiment, the cooling fluid may be supplied to the cooling fluid supply plenum and, thereafter, to the cooling tube 402 at pressures suitable for achieving a flow of cooling fluid 210 from each cooling fluid inlet 412 having a velocity of less than about 0.95 mach. For example, when the cooling fluid is air, the air may be supplied to the cooling fluid supply plenum such that the pressure in the cooling fluid plenum is about 7 psig. For a cooling fluid inlet having a height H of 7.620 millimeters and a width W of 0.203 millimeters this corresponds to a flow of cooling fluid of about 1 standard cubic foot/minute (scfm) from each cooling fluid inlet.

The flow of cooling fluid 210 emitted from each cooling fluid inlet 410 is directed across the optical fiber pathway 414 and, more specifically, across the optical fiber 300, towards the opposite side of the cooling tube thereby cooling the optical fiber. After the flow of cooling fluid 210 traverses the optical fiber pathway 414, the cooling fluid is vented through the cooling fluid vents 412 in a direction substantially perpendicular to the direction of travel of the optical fiber and into the cooling fluid exhaust plenums 404, 406.

For example, FIG. 8 graphically illustrates a fluid flow egress 412 in a direction which is perpendicular to the draw direction of the optical fiber. Because the cooling fluid is vented out of the cooling tube 402 in a direction perpendicular to the axial length of the cooling tube over the axial length of the cooling tube 402, bulk axial flow of the cooling fluid is prevented thereby improving the cooling capabilities of the optical fiber cooling system 200b. After the cooling fluid is vented into the cooling fluid exhaust plenums 404, 406, the cooling fluid may be further vented to the ambient atmosphere or, alternatively, recovered with a fluid recovery system.

In either embodiment of the cooling fluid systems shown and described herein, the optical fiber cooling system has sufficient cooling capacity to cool the optical fiber 300 such that, as the optical fiber 300 exits the optical fiber cooling system 200a, 200b, the optical fiber 300 is generally at a temperature at which a protective coating may be applied to the optical fiber 300. For example, in the embodiments described herein, the optical fiber has a temperature of less than about 80° C. upon exiting the optical fiber cooling system 200a, 200b.

Referring again to FIG. 1, after the optical fiber 300 exits the optical fiber cooling system 200, the optical fiber enters a coating system 130 in which one or more protective coatings are applied to the optical fiber and cured. The coating(s) may comprise polymeric coating such as, for example, a UV curable coating or a thermoplastic coating. However, it should be understood that the coating system may be configured to apply any type of material suitable for coating an optical fiber and thereby enhancing the optical properties of the optical fiber 300 and/or for protecting the optical fiber 300.

As the optical fiber 300 exits the coating system 130, the diameter of the coated optical fiber 300 is measured again using a non-contact sensor 118. Thereafter, a non-contact flaw detector 132 is used to examine the coated optical fiber 300 for damage and/or flaws that may have occurred during the manufacture of the optical fiber 300. It should be understood that, after the optical fiber 300 has been coated, the optical fiber 300 is less susceptible to damage due to mechanical contact. Accordingly, in subsequent processing stages (not shown) mechanical contact with the optical fiber 300 may be acceptable.

As shown in FIG. 1, a fiber take-up mechanism 140 utilizes various drawing mechanisms 142 and pulleys 141 to provide the necessary tension to the optical fiber 300 as the optical fiber is drawn through the system 100. Accordingly, it will be understood that the fiber take-up mechanism 140 controls the speed at which the optical fiber 300 is drawn through the through the system 100. After manufacture of the optical fiber 300 is complete, the optical fiber 300 is wound onto a storage spool 148.

It should now be understood that the optical fiber cooling systems described herein may be incorporated in systems for manufacturing coated optical fiber to facilitate cooling the optical fiber before a coating is applied to the optical fiber. Further, it will be understood that the optical fiber cooling systems described herein facilitate faster optical fiber draw speeds (e.g., draw speeds up to or in excess of 35 m/s) due to the improved cooling capabilities of the optical fiber cooling system which, in turn, are due to the substantial mitigation or elimination of bulk axial flow of cooling fluid through the optical fiber cooling system.

Further, by positioning the cooling fluid outlets (or cooling fluid inlets, depending on the configuration of the optical fiber cooling system) such that axially consecutive cooling fluid outlets are generally in 180 degree opposition with one another (albeit offset from one another in the axial direction of the optical fiber cooling system) improves the dynamic stability of the optical fiber as it passes through the optical fiber cooling system. This improved dynamic stability, in turn, facilitates the use of higher cooling fluid flow rates and therefore improves the cooling capacity of the optical fiber cooling system.

The elimination of bulk axial flow and the use of higher cooling fluid flow rates significantly improve the cooling capabilities of the optical fiber cooling systems described herein such that less expensive cooling fluids may be used in conjunction with the optical fiber cooling systems. For example, instead of chilled helium, a less expensive gas such as nitrogen or air may be used with the optical fiber cooling systems. When used in conjunction with the systems descried herein these less expensive gasses still provide for improved cooling capabilities and further decrease optical fiber production costs. Further, the overall improvement in the cooling capabilities of the optical fiber cooling systems may also facilitate eliminating the need for chilling the cooling fluid thereby further reducing the costs associated with optical fiber manufacturing.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for cooling an optical fiber during an optical fiber drawing operation, the method comprising:
    drawing an optical fiber along an optical fiber pathway positioned between a first cooling tube and a second cooling tube at a rate of at least 35 m/s;
    directing a flow of cooling fluid onto the optical fiber through cooling fluid outlets positioned along an axial length of the first cooling tube;
    directing a flow of cooling fluid onto the optical fiber through cooling fluid outlets positioned along an axial length of the second cooling tube wherein the cooling fluid outlets of the second cooling tube are oriented to direct a flow of cooling fluid across the optical fiber pathway towards the first cooling tube and the cooling fluid outlets of the first cooling tube are oriented to direct a flow of cooling fluid across the optical fiber pathway towards the second cooling tube and the cooling fluid outlets are tapered such that the flow of cooling fluid provided by the fluid outlets of at least one tube is focused between the drawn fiber and the opposing wall of the other cooling tube; and
    venting the cooling fluid such that bulk axial flow of cooling fluid along the optical fiber pathway is prevented.

2. The method of claim 1 wherein the optical fiber pathway is not enclosed and the cooling fluid is vented to ambient atmosphere.

3. The method of claim 1 further providing a fluid containment enclosure, wherein the first cooling tube and the second cooling tube are disposed in the fluid containment enclosure.

4. The method of claim 1 wherein the cooling fluid outlets are tapered from an inner diameter of the cooling tube to an outer diameter of the cooling tube.

5. The method of claim 1 wherein the cooling fluid outlets of the first cooling tube are offset from the cooling fluid outlets of the second cooling tube in an axial direction such that the cooling fluid outlets of the first cooling tube are not opposed to the cooling fluid outlets of the second cooling tube.

* * * * *